(12) United States Patent
Ohno et al.

(10) Patent No.: US 7,908,319 B2
(45) Date of Patent: Mar. 15, 2011

(54) INFORMATION DISPLAY APPARATUS AND INFORMATION DISPLAY METHOD

(75) Inventors: Tomoyuki Ohno, Kanagawa-ken (JP); Tetsu Fukuda, Kanagawa-ken (JP); Shuntaro Aratani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1392 days.

(21) Appl. No.: 11/003,496

(22) Filed: Dec. 6, 2004

(65) Prior Publication Data

US 2005/0138561 A1 Jun. 23, 2005

(30) Foreign Application Priority Data

Dec. 19, 2003 (JP) ................................. 2003-422318

(51) Int. Cl.
*G06F 15/16* (2006.01)
(52) U.S. Cl. ........ 709/204; 709/205; 709/206; 709/207; 709/250; 715/700; 715/733; 382/235; 382/276; 382/312
(58) Field of Classification Search .................. 709/204, 709/205, 206, 207, 250; 382/235, 276, 312; 715/700, 733
See application file for complete search history.

(56) References Cited

U.S. PATENT DOCUMENTS

| | | | | |
|---|---|---|---|---|
| 5,727,155 A | | 3/1998 | Dawson .................. 395/200.35 |
| 5,867,654 A | * | 2/1999 | Ludwig et al. ................ 709/204 |
| 5,892,509 A | * | 4/1999 | Jakobs et al. ................ 715/751 |
| 5,917,470 A | | 6/1999 | Fujioka .......................... 345/127 |
| 5,983,263 A | * | 11/1999 | Rothrock et al. ............. 709/204 |
| 6,898,620 B1 | * | 5/2005 | Ludwig et al. ................ 709/204 |
| 6,961,511 B2 | | 11/2005 | Ohno et al. ...................... 386/83 |
| 2002/0003575 A1 | * | 1/2002 | Marchese ...................... 348/231 |
| 2002/0016964 A1 | | 2/2002 | Aratani et al. .................. 725/39 |
| 2002/0051083 A1 | | 5/2002 | Aratani et al. ................ 348/554 |
| 2003/0097408 A1 | | 5/2003 | Kageyama et al. ........... 709/205 |
| 2003/0100316 A1 | * | 5/2003 | Odamura ...................... 455/456 |
| 2004/0061805 A1 | | 4/2004 | Shibamiya et al. ........... 348/565 |
| 2004/0068740 A1 | | 4/2004 | Fukuda et al. .................. 725/45 |
| 2004/0107449 A1 | | 6/2004 | Fukuda et al. ................ 725/135 |
| 2004/0243482 A1 | * | 12/2004 | Laut ................................ 705/27 |
| 2005/0162965 A1 | | 7/2005 | Fukuda et al. ........... 365/230.03 |
| 2005/0172332 A1 | | 8/2005 | Fukuda et al. ................ 725/139 |
| 2006/0039361 A1 | | 2/2006 | Ohno et al. .................... 370/352 |

FOREIGN PATENT DOCUMENTS

| | | |
|---|---|---|
| JP | 2000-333119 | 11/2000 |
| JP | 2002278864 A | 9/2002 |
| JP | 2003-122693 | 4/2003 |
| JP | 2003-150529 | 5/2003 |
| JP | 2003134462 A | 5/2003 |

\* cited by examiner

*Primary Examiner* — William C Vaughn, Jr.
*Assistant Examiner* — Farrukh Hussain
(74) *Attorney, Agent, or Firm* — Fitzpatrick, Cella, Harper & Scinto

(57) ABSTRACT

When the same image is pleasantly viewed by information display apparatuses connected to each other through a network, each of the information display apparatuses has a unit for acquiring display format information of an image displayed by a destination information display apparatus, so that information representing a display format of the image displayed by the destination information display apparatus is displayed on the displayed image in a multiplex mode to make it possible know a viewing state of the destination information display apparatus.

5 Claims, 9 Drawing Sheets

FIG. 9A 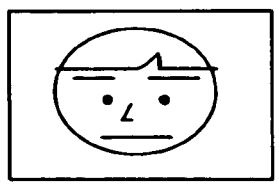 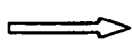 YAMADA
FIG. 9B 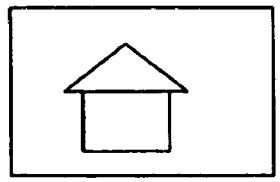 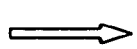 SINGLE
FIG. 9C  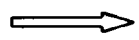 ZOOM
FIG. 9D 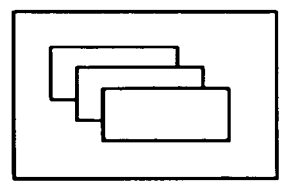  SLIDE

INFORMATION DISPLAY APPARATUS AND INFORMATION DISPLAY METHOD

BACKGROUND OF THE INVENTION

1. Field of the Invention

The present invention relates to an information display apparatus and an information display method which transmit and receive information such as a still image or a moving image between a plurality of information display apparatuses connected through a network to cause a user to perform communication.

2. Description of the Related Art

A form of communication in which information is exchanged among users who live in distant places and have information display apparatuses has been popularized against a backdrop of development of an internet connection environment achieved by ADSL technology and optical fibers.

As an example of the form of communication, an electronic mail, a messenger service, or the like which transmits character information, a still image, a moving image, and the like is known. A communication means which make it possible to easily exchange interested video information between information exchange terminals connected to a computer network typified by the internet is disclosed in Japanese Unexamined Patent Publication No. 2003-150529 (US AA 2003097408) and Japanese Unexamined Patent Publication No. 2003-122693.

A backdrop of explosive growth of digital cameras in recent years creates a situation in which everybody can easily format original image information. In order to show such image information to his/her friend or family who lives in a distant place, the following communication means is used. That is, a user discloses a plurality of pieces of image information on his/her homepage, and the user exchanges impressions and opinions obtained by viewing the images with the friend or the family through electronic mails.

SUMMARY OF THE INVENTION

However, in a conventional technique, when communication between users who live in distant places and have information display apparatuses is performed by using the communication means while viewing a plurality of pieces of image information, the following problems are posed.
(1) A specific image which is included in the plurality of images and viewed by each user cannot be known, and
(2) A specific format such as an enlarged display format or a slide show display format in which each user views an image cannot be known.

The present invention has been made to solve the above problems of the conventional technique, and has as its object to provide an information display apparatus and an information display method which are to perform smooth communication between users who live in distant places and have information display apparatus.

In order to achieve the above object, the present invention provides an information display apparatus which is connected to a destination information display apparatus through a network and receives image information shared with the destination information display apparatus to make it possible to display an image, including means for acquiring display format information of the image displayed on the destination information display apparatus, and wherein information representing a display format of the image displayed by the destination information display apparatus is displayed on the basis of the acquired display format information.

A display of information representing a display format of an image displayed by the destination information display apparatus, the display format being displayed by the information display apparatus, is determined by a display format of the image displayed by the information display apparatus, and the display format is preferably displayed on the image displayed by the information display apparatus in a multiplex mode.

As the display format, any one of a format which displays an index of the image information, a format which displays one entire image of the image information, a format which displays the image information such that images are sequentially switched with time, and a format which displays an enlarged part of the image information is preferably used.

The present invention provides an information processing apparatus which is connected to a destination information display apparatus through a network and receives image information shared with the destination information display apparatus to make it possible to display an image, including means for acquiring display format information of an image displayed by the destination information display apparatus, and wherein a video signal for displaying information representing the display format of the image displayed by the destination information display apparatus is outputted on the basis of the acquired display format information.

The present invention provides an information display method which receives image information shared by at least two information display apparatuses connected through a network to make it possible to display an image, including: the step of causing each of the information display apparatuses to acquire display format information of an image displayed on a destination information display apparatus; and the step of displaying information representing a display format of the image displayed by the destination information display apparatus on the basis of the acquired display format information.

The present invention provides an information processing method which receives image information shared by an information processing apparatus and an information display apparatus connected to each other through a network to make it possible to display an image, including: the step of causing the information processing apparatus to acquire display format information of an image displayed by the destination information display apparatus; and the step of outputting a video signal for displaying information representing a display format of the image displayed by the destination information display apparatus on the basis of the acquired display format information.

The present invention includes a computer program for causing a computer to execute the information display method and the information processing method and a storage medium in which the computer program is stored.

According to the present invention, when users who live in distant places and have of information display apparatuses communicate with each other while viewing a plurality of image, each user knows an image which is included in the plurality of images and viewed by another user, and each user knows a specific format such as an enlarged display format or a slide show display format in which another user views an image. In this manner, each user can easily know a specific photograph to which the other users give attentions and in which the other users are interested, so that the users can more smoothly communicate with each other.

BRIEF DESCRIPTION OF THE DRAWINGS

FIG. 9 is a diagram showing a modification obtained when a display pattern of a display format of another information display apparatus is displayed with characters.

DETAILED DESCRIPTION OF THE PREFERRED EMBODIMENT

A preferred embodiment of the present invention will be illustratively described below with reference to the accompanying drawings.

Figure 1:
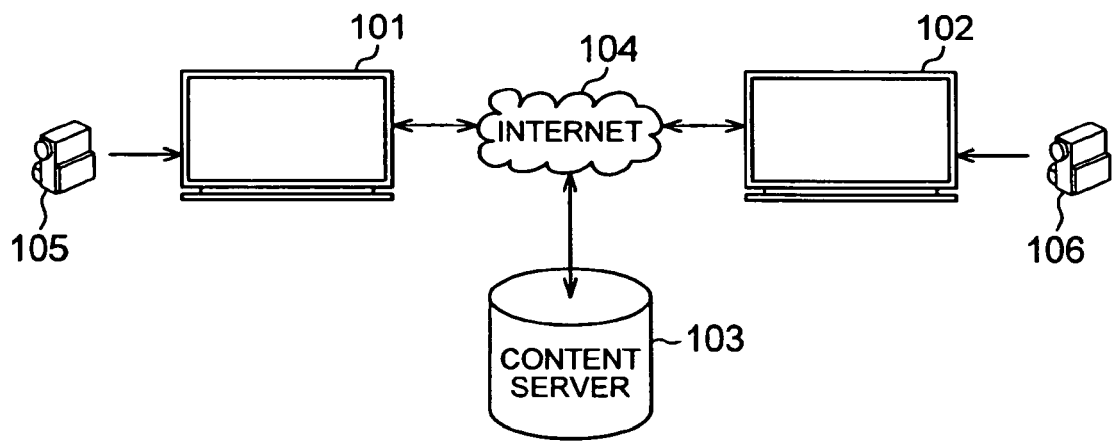
FIG. 1 is a conceptual diagram showing a connection format of an information display apparatus according to an embodiment of the present invention.

FIG. 1 is a conceptual diagram showing a connection format of an information display apparatus according to the embodiment of the present invention. In FIG. 1, reference numeral 101 denotes a first information display apparatus; 102, a second information display apparatus; 103, a content server; 104, the internet; 105, a first digital video camcorder (to be referred to as a first DVC hereinafter); and 106, a second digital video camcorder (to be referred to as a second DVC hereinafter).

FIG. 1 shows a connection format of a system which performs communication between users who use the first information display apparatus 101 and the second information display apparatus 102 while viewing a plurality of images photographed by a digital camera or the like and stored in the content server 103. Image display units included in the first information display apparatus 101 and the second information display apparatus 102 are not necessarily equal to each other. An operation of the first information display apparatus 101 will be mainly described below.

Figure 2:
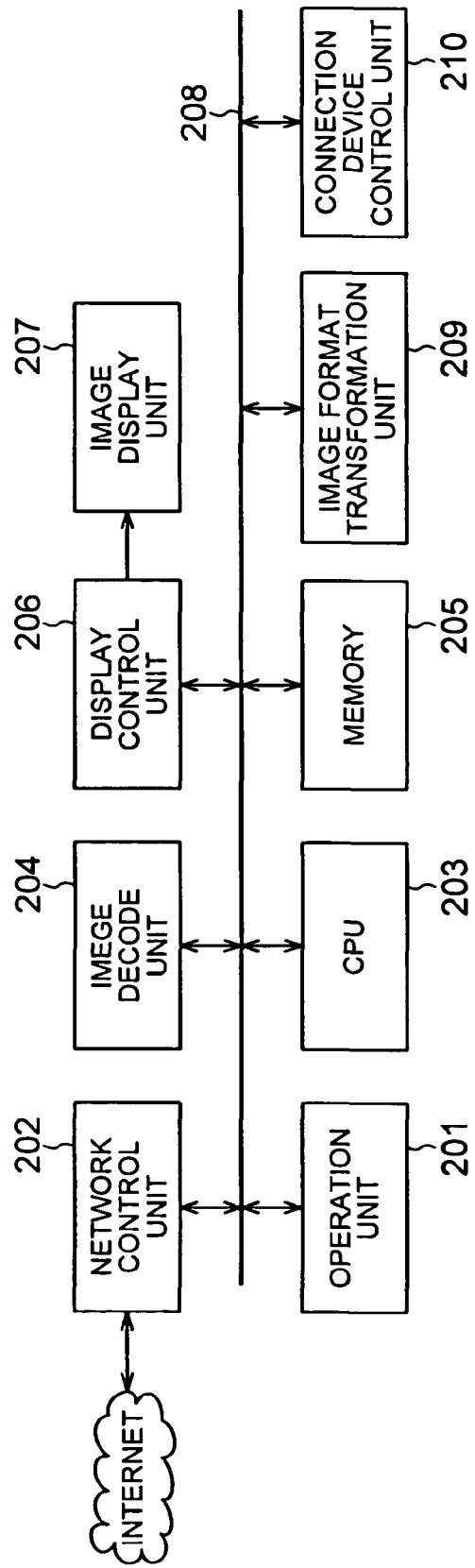
FIG. 2 is a block diagram showing the configuration of the information display apparatus according to the embodiment of the present invention.

FIG. 2 is a block diagram showing the configuration of the information display apparatus according to the embodiment of the present invention. In FIG. 2, reference numeral 201 denotes an operation unit; 202, a network control unit; 203, a CPU; 204, an image decode unit; 205, a memory; 206, a display control unit; 207, an image display unit; 208, a system bus; and 209, an image format transformation unit; and 210, a connection device control unit.

These components are not necessarily stored as an integrated unit. For example, a hard disk drive (HDD) or a set-top box (STB) with an HDD serving as an information processing apparatus are stored as a unit different from the image display unit. A video signal for displaying a video may be transmitted from the information processing apparatus to the image display unit.

Figure 3:
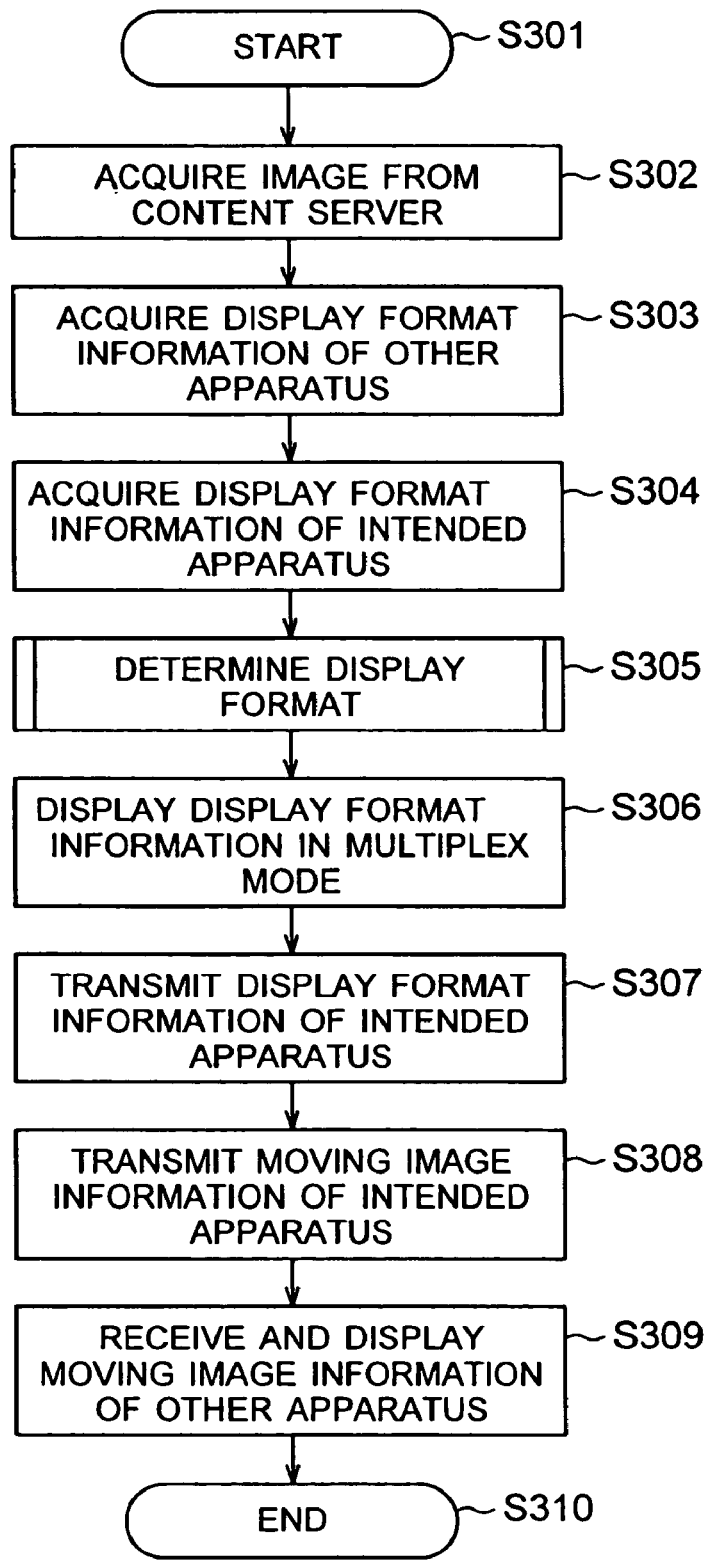
FIG. 3 is an operation flow 1 of the information display apparatus according to the embodiment of the present invention.

FIG. 3 shows an operation flow obtained when one formation of a display screen is displayed on the image display unit 207 when a user executes a communication start operation for the operation unit 201 shown in FIG. 2.

Figure 4:
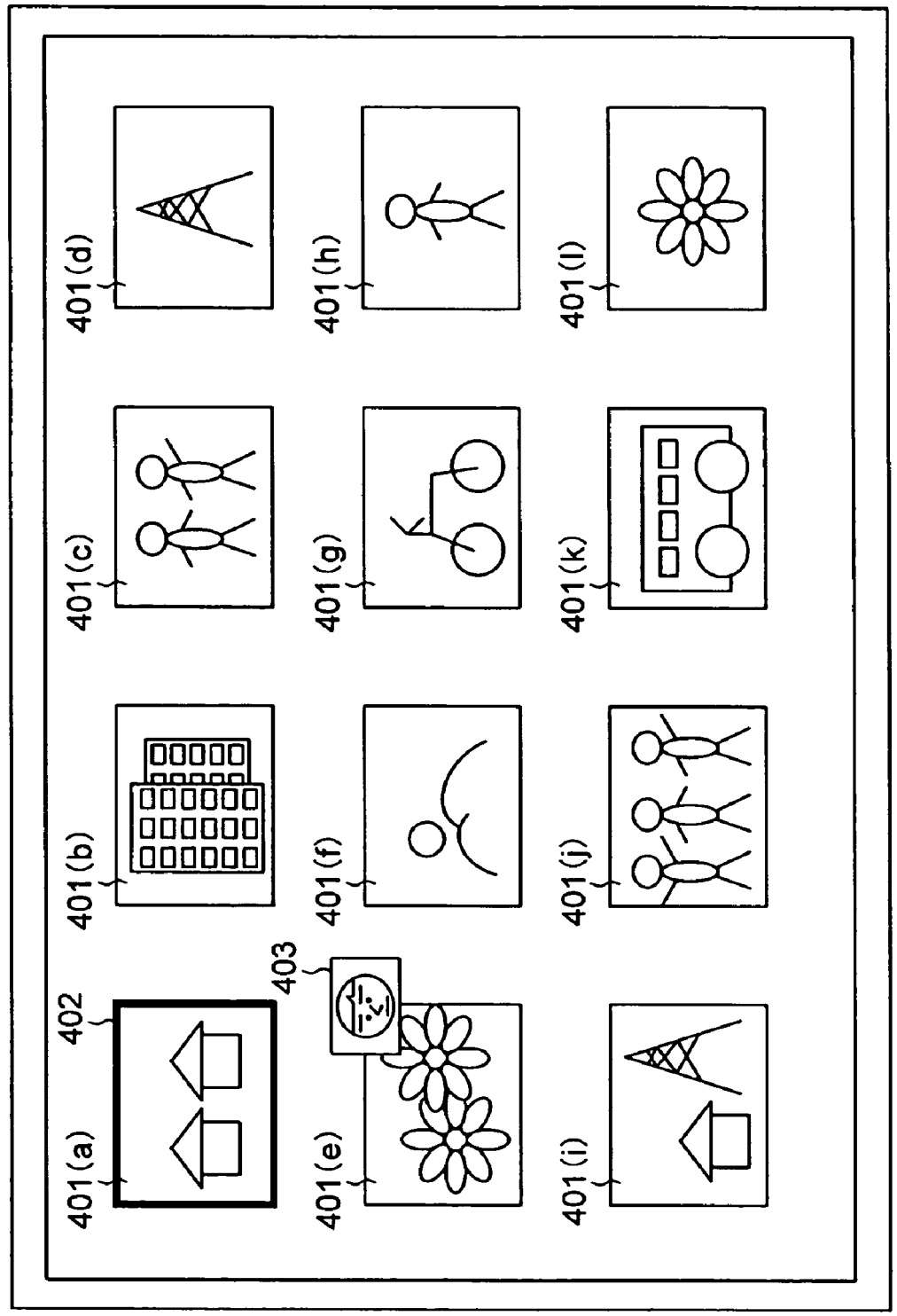
FIG. 4 is an index display serving as one format of a screen displayed by the information display apparatus according to the present invention.

FIG. 4 shows an index display which is one format of a screen displayed on the image display unit 207 when the communication start operation is executed. Reference numerals 401(*a*) to 401(*l*) denote a plurality of image data used in communication. Reference numeral 402 denotes a focus frame which is moved by an operation of a user and which shows a candidate of an image to be displayed on the entire screen of the image display unit 207. Reference numeral 403 denotes a moving image icon which displays moving image information received from a destination as an icon. As will be described later, the information display apparatuses 101 and 102 are designed to display the moving image icon 403 on an image which is being selected by the destination in a multiplex mode.

When the communication start operation using the operation unit 201 in FIG. 2 is performed by a user in step S301 in FIG. 3, the CPU 203 acquires a plurality of image data used in communication from the content server 103 in FIG. 1 through the network control unit 202.

The acquired data are temporarily stored in the memory 205. The image data accumulated in the memory 205 are decoded by the image decode unit 204. Thereafter, the decoded data are transmitted to the display control unit 206 and displayed on the image display unit 207.

In step S303, the CPU 203 acquires a display format information of another information display apparatus, i.e., the second information display apparatus 102 in FIG. 2 through the network control unit 202.

In this case, the display format information includes:

information representing whether a communication operation is started;

information representing a specific format (index display format, single display format (entire display), enlarged display format, or slide show display format (a display operation is performed such that pieces of image information are sequentially switched with time)) in which an image acquired from the content server 103 is displayed;

image identification information (file name or URL (Uniform Resource Locator) indicating a location of an image located on the internet) of an image set in the focus frame 402 for indicating a candidate of an image; image identification information (file name or URL (Uniform Resource Locator) indicating a location of an image located on the internet) which is being displayed on the image display unit 207 when the single display format, the enlarged display format, or the slide show display format is set;

location information of a magnification or an enlarged part when the enlarged display format is set;

image switching interval information when the slide show display is set;

and the like.

In step S304, the CPU 203 acquires display format information of an intended information display apparatus (first information display apparatus 101). For example, immediately after a communication start operation is performed, the CPU 203 acquires information representing that an index display state, i.e., a format in which a plurality of images as shown in FIG. 4 are displayed as a list is set and information representing a specific image included in the plurality of images and set in the focus frame 402.

In step S305, on the basis of the display format information of the other information display apparatus and the intended information display apparatus acquired in steps S303 and S304, the CPU 203 determines information representing a display format of the intended information display apparatus and a display format of the other information display apparatus on a screen displayed on the image display unit 207. In this case, the display state of the intended information display apparatus is the index display format, the display format is determined according to the display pattern list shown in FIG. 5.

Figure 5:
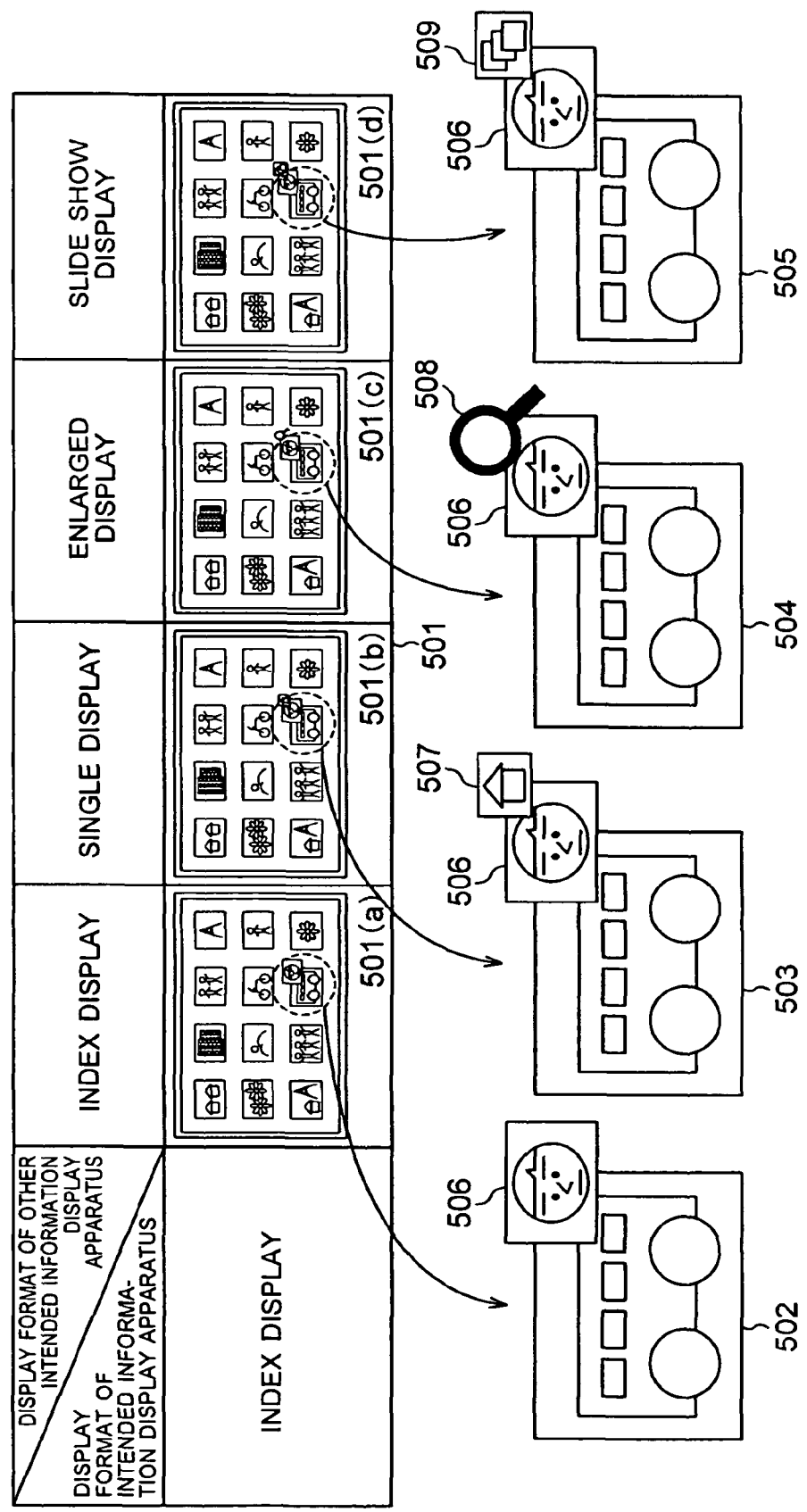
FIG. 5 is a diagram showing a display pattern list of a display format of another information display apparatus which performs a display operation when an intended information display apparatus performs an index display operation.

In FIG. 5, a table denoted by reference numeral 501 shows a display pattern list of information representing display formats of the other information display apparatus displayed when the intended information display apparatus performs an index display operation. The display patterns will be described below.

501(a): When the other information display apparatus is performing an index display operation, it is determined that a moving image icon 506 of the user of the other display apparatus is displayed on an image selected by the other information display apparatus, i.e., on an image 502 indicated with a focus frame in a multiplex mode. In place of the moving image icon 506, a name "YAMADA" of the user of the other information display apparatus as shown in FIG. 9A may be displayed by characters.

501(b): When the other information display apparatus is performing a single display operation to display only one image, a moving image icon 506 of the user of the other information display apparatus and a single display icon 507 representing that a single display format is set are displayed on an image 503 displayed in the single display format in a multiplex mode. In place of the single display icon 507, "SINGLE" representing that the single display format is set may be displayed with characters as shown in FIG. 9B.

501(c): When the other information display apparatus is performing an enlarged display operation, it is determined that the moving image icon 506 of the user of the other information display apparatus and an enlarged display icon 508 representing an enlarged display format are displayed on an image 504 displayed in the enlarged display format in a multiplex mode. In place of the enlarged display icon 508, "ZOOM" representing the enlarged display format is set may be displayed with characters as shown in FIG. 9C.

501 (d): When the other information display apparatus is performing a slide show display operation, it is determined that the moving image icon 506 of the user of the other information display apparatus and a slide show display icon 509 representing that the slide show display operation is being performed are displayed on an image 505 displayed in the slide show display format in a multiplex mode, and that locations of the image on which the moving image icon 506 and the slide show display icon 509 are displayed in the multiplex mode are changed with the progress of the slide show display operation. In place of the slide show display icon 509, "SLIDE" representing that the slide show display operation is being performed may be displayed with characters as shown in FIG. 9D.

The determined display pattern information of the display format of the other information display apparatus is transmitted from the CPU 203 to the display control unit 206 and then displayed on the image display unit 207 in step S306 in FIG. 3.

In step S307, upon completion of the display control operation of the display format of the other information display apparatus, the CPU 203 transmits the display format information of the intended information display apparatus to the other information display apparatus.

In step S308, the CPU 203 controls the first DVC 105 connected to the first information display apparatus 101 through the connection device control unit 210, acquires moving image information of the user of the first information display apparatus 101, and performs transformation to a streaming data format in which the moving image information is transmitted to the second information display apparatus 102 through the internet 104 in the image format transformation unit 209. The CPU 203 starts transmission of the transformed moving image information to the second information display apparatus 102 through the network control unit 202.

In step S309, the CPU 203 starts receiving moving image information of the user of the second information display apparatus 102 transmitted from the second information display apparatus 102 through the network control unit 202, decodes the moving image information in the image decode unit 204, and transmits the decoded moving image information to the display control unit 206. The CPU 203 displays the moving image information as the moving image icon 403 on the image display unit 207. In this manner, the user of the first information display apparatus 101 can communicate with the user of the second information display apparatus 102 while looking at the image of the user of the second information display apparatus 102 displayed by the second DVC 106.

In step S310, the operation performed when a communication start operation is performed is completed. Upon completion of the operation, the CPU 203 repeats the operations for acquiring the pieces of display format information of the other information display apparatus and the intended information display apparatus shown in steps S801 and S802 in the operation flow shown in FIG. 8 until a communication end operation is executed by the user.

Figure 6:
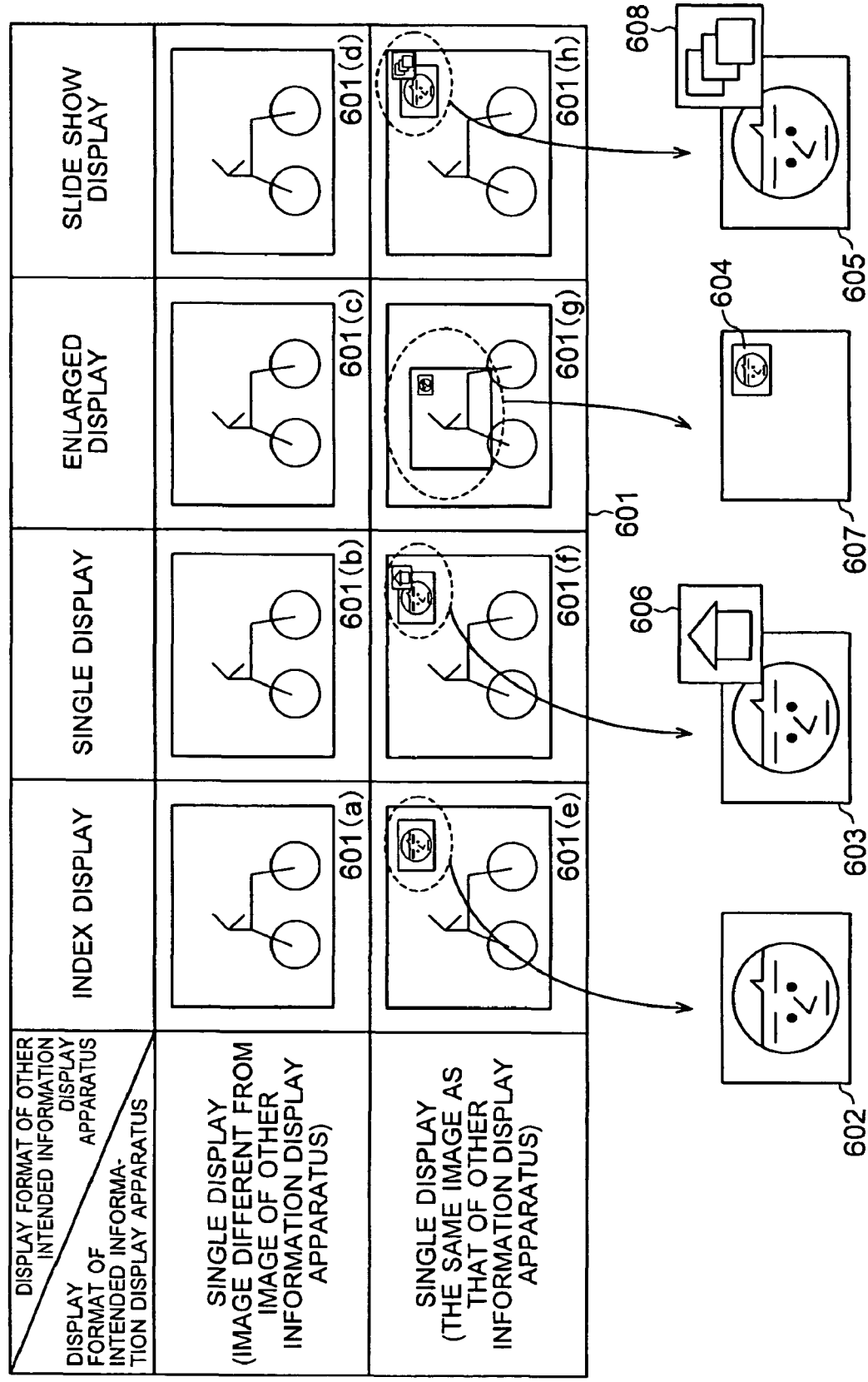
FIG. 6 is a diagram showing a display pattern list of a display format of another information display apparatus which performs a display operation when an intended information display apparatus performs a single display operation.
Figure 7:
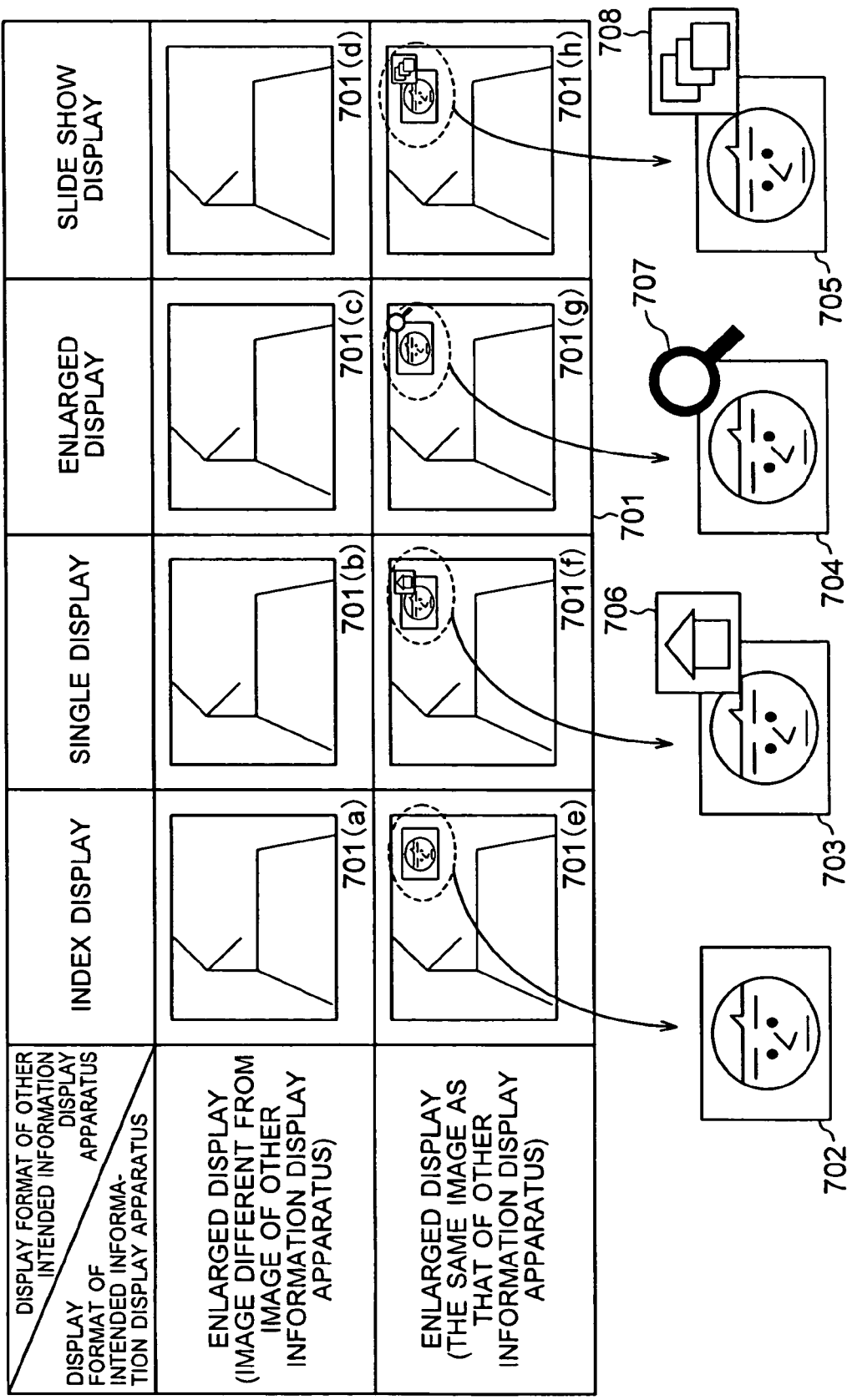
FIG. 7 is a diagram showing a display pattern list of a display format of another information display apparatus which performs a display operation when an intended information display apparatus performs an enlarged display operation.

When it is detected in step S803 that any one of the pieces of display format information changes, a display format of a screen displayed on the image display unit 207 is determined according to the display pattern list of the information representing the display formats of the intended information display apparatus and the other information display apparatus shown in FIGS. 6 and 7.

In FIG. 6, the table indicated by reference numeral 601 shows a display pattern list of the information representing the display format of the other information display apparatus which performs a display operation when the intended information display apparatus performs a single display operation. The respective display patterns will be described below.

601(a) to (d): When the other information display apparatus selects or displays an image different from an image selected or displayed by the intended information display apparatus, it is determined that the display format information of the other information display apparatus is not displayed.

601(e): When the other information display apparatus performs an index display operation and is selecting the same image as that of the intended information display apparatus by the focus frame, it is determined that a moving image icon 602 of the user of the other information display apparatus is displayed on an image displayed in a single display format in a multiplex mode. In place of the moving image icon 602, a name "Yamada" of the user of the other information display apparatus may be displayed with characters as shown in FIG. 9A.

601(f): When the other information display apparatus is displaying the same image as that of the intended information display apparatus in a single display format, it is determined a moving image icon 603 of the user of the other information display apparatus and a single display icon 606 representing that a single display format is set are displayed on an image displayed in the single display format in a multiplex mode. In place of the single display icon 606, "SINGLE" representing that the single display format is set may be displayed with characters as shown in FIG. 9B.

601(*g*): When the other information display apparatus is displaying the same image as that of the intended information display apparatus in an enlarged display format, it is determined that an enlarged frame display 607 representing a region enlarged by the user of the other information display apparatus and a moving image icon 604 of the user of the information display apparatus are displayed on an image displayed in a single display format in a multiplex mode.

601(*h*): When the other information display apparatus is displaying a plurality of images in a slide show display format, it is determined that a moving image icon 605 of the user of the other information display apparatus and a slide show display icon 608 representing that the slide show display format is set are displayed on an image displayed in the single display format in a multiplex mode in only a period in which the same image as that of the intended information display apparatus is displayed in the slide show display operation. In place of the slide show display icon 608, "SLIDE" representing that the slide show display operation is being performed may be displayed with characters as shown in FIG. 9D.

In FIG. 7, a table indicated by reference numeral 701 shows a display pattern list of information representing display formats of the other information display apparatus displayed when the intended information display apparatus performs an enlarged display operation. The display patterns will be described below.

701(*a*) to (*d*): When the other information display apparatus selects or displays an image different from the image selected or displayed by the intended information display apparatus, it is determined that display format information of the other information display apparatus is not displayed.

701(*e*): When the other information display apparatus performs an index display operation and is selecting the same image as that of the intended information display apparatus by the focus frame, it is determined that a moving image icon 702 of the user of the other information display apparatus is displayed on an image displayed in an enlarged display format in a multiplex mode. In place of the moving image icon 702, a name "Yamada" of the user of the other information display apparatus may be displayed with characters as shown in FIG. 9A.

701(*f*): When the other information display apparatus is displaying the same image as that of the intended information display apparatus in a single display format, it is determined a moving image icon 703 of the user of the other information display apparatus and a single display icon 706 representing that a single display format is set are displayed on an image displayed in the enlarged display format in a multiplex mode. In place of the single display icon 706, "SINGLE" representing that the single display format is set may be displayed with characters as shown in FIG. 9B.

701(*g*): When the other information display apparatus is displaying the same image as that of the intended information display apparatus in an enlarged display format, it is determined that a moving image icon 704 of the user of the information display apparatus and an enlarged display icon 707 representing that the enlarged display format is set are displayed on an image displayed in the enlarged display format in a multiplex mode. In place of the enlarged display icon 707, "ZOOM" representing that the enlarged display format is set may be displayed with characters as shown in FIG. 9C.

701(*h*): When the other information display apparatus is displaying a plurality of images in a slide show display format, it is determined that a moving image icon 705 of the user of the other information display apparatus and a slide show display icon 708 representing that the slide show display format is set are displayed on an image displayed in the enlarged display format in a multiplex mode in only a period in which the same image as that of the intended information display apparatus is displayed in the slide show display operation. In place of the slide show display icon 708, "SLIDE" representing that the slide show display operation is being performed may be displayed with characters as shown in FIG. 9D.

The determined display pattern information of the display format of the other information display apparatus is transmitted from the CPU 203 to the display control unit 206 in step S805 and displayed by the image display unit 207.

In step S806, upon completion of the display control operation of the display format of the other information display apparatus, the CPU 203 decides whether the change of the display format information detected in step S803 is the change of the display format information of the intended information display apparatus. When the change is the change in the intended information display apparatus in step S806, the display format information is transmitted to the other information display apparatus in step S807. When the display format information of the intended information display apparatus is not changed, the CPU 203 directly returns to step S801.

The operations in steps S801 to S807 are repeated to alternately transmit and receive the pieces of display format information of the intended information display apparatus and the other information display apparatus which communicate with each other and displayed on a screen, so that a user of each information display apparatus knows a specific image which is included in a plurality of images and which is viewed by a destination with which the user communicates, so that the user know a specific format such as an enlarged display format or a slide show display format in which the image is displayed.

In this manner, each user easily know a specific photograph to which the other users give attentions and in which the other users are interested, so that the users can more smoothly communicate with each other.

In the above explanation is made with reference to communication performed by users of two information display apparatuses as shown in FIG. 1. However, pieces of display format information of two or more information display apparatuses connected through a network are acquired in step S303 in FIG. 3 and step S801 in FIG. 8 to determine display formats in steps S305 and S804, so that the users of three or more information display apparatuses can also be communicate with each other.

The embodiment explains an example in which, as information of a display format of another information display apparatus, an icon such as a moving image icon, a single display icon, an enlarged display icon, or a slide show display icon is displayed. However, for example, as shown in FIGS. 9A to 9D, the respective icons may be replaced with characters. In addition, any information display such as an icon, a character, a mark, a graphic, or an image which is specified as information representing the display format of the other information display apparatus may be used.

In the embodiment, as the information display apparatus, an apparatus integrated with the image display unit is described. However, the information display apparatus is stored as a unit different from the image display unit. The present invention is also established as an invention for an information processing apparatus such as a hard disk drive (HDD) which transmits a video signal for displaying a video to the image display unit or a set-top box (STB) which includes a hard disk drive (HDD).

Figure 8:
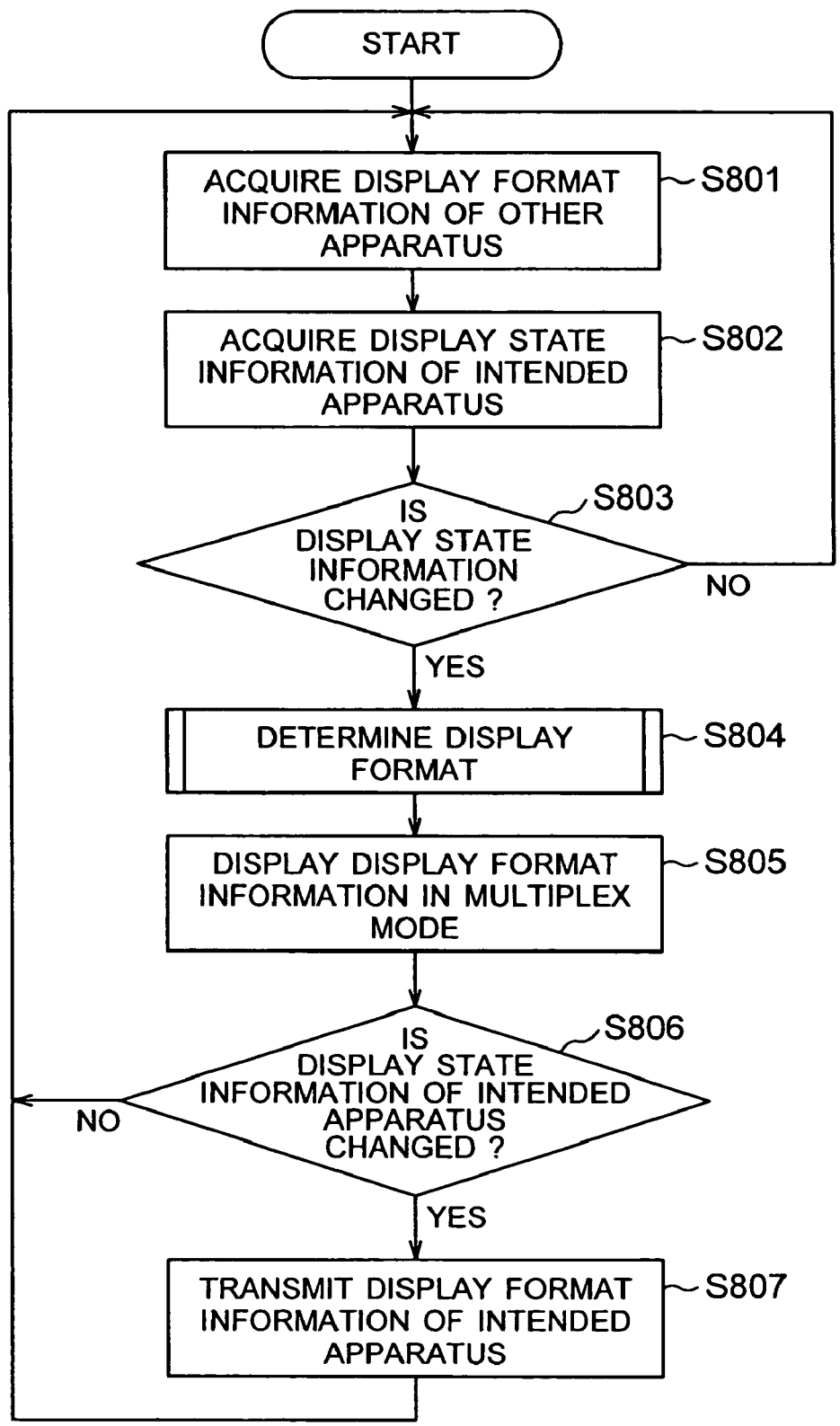
FIG. 8 is an operation flow 2 of the information display apparatus according to the embodiment of the present invention.

Furthermore, the present invention is also established as an invention for a computer program to cause a computer to execute the method described in the embodiment by using the flows in FIGS. 3 and 8 and a storage medium in which the computer program is stored.

This application claims priority from Japanese Patent Application No. 2003-422318 filed Dec. 19, 2003, which is hereby incorporated by reference herein.

What is claimed is:

1. A display system including a first information display apparatus and a second information display apparatus, each of which are connected to a network and receives images from a server, and displays the received images, said first information display apparatus comprising:
   a first screen;
   a first display control unit which displays, on the first screen, one or more images received from the server through the network; and
   a transmitting unit which transmits, to said second information display apparatus through the network, image identification information and display format information of one or more images being displayed on the first screen,
   wherein the display format information includes a display format of a slide show in which a plurality of images are sequentially displayed and switched with time, and said second information display apparatus comprising:
   a second screen;
   a second display control unit which displays on the second screen a plurality of images received from the server through the network, in a display format in which the plurality of images are arranged and displayed on the second screen together; and
   an acquiring unit which acquires the image identification information and the display format information transmitted from the transmitting unit of said first information display apparatus,
   wherein, the second display control unit displays an icon representing the display format information transmitted from the transmitting unit of said first information display apparatus, overlapped on a partial area of an image, from among the plurality of images displayed on the second screen, which is a same image as the image being displayed on the first screen of said first information display apparatus, based on the image identification information and the display format information acquired by the acquiring unit, and
   wherein, when the display format information, which has been transmitted from the transmitting unit of the first information display apparatus and acquired by the acquiring unit, shows a display format of a slide show, the second display control unit changes a display position on the second screen of the icon representing the display format of the slide show, according to progress of the slide show in the first information display apparatus, and
   wherein, when a first image is displayed on the first screen of the first information display apparatus as part of the slide show, the position of the icon representing the display format of the slide show is displayed on the corresponding first image among the plurality of images simultaneously being displayed on the second screen of the second information display apparatus, and when the slide show being displayed on the first screen progresses to a second image, the position of the icon representing the display format of the slide show displayed on the second screen changes its location from the first image to the corresponding second image among the plurality of images simultaneously being displayed on the second screen.

2. The display system according to claim 1, wherein, the image identification information is a Uniform Resource Locator indicating a location of the image on the network.

3. A display system including a first information display apparatus and a second information display apparatus, each of which are connected to a network and receives images from the server, and displays the received images, said first information display apparatus comprising:
   a first screen;
   a first display control unit which displays on the first screen one or more images received from the server through the network; and
   a video camera unit which photographs a moving image of the user of the first information display apparatus;
   a transmitting unit which transmits, to said second information display apparatus through the network, image identification information of one or more images being displayed on the first screen and the moving image of the user of the first information display apparatus, and said second information display apparatus comprising:
   a second screen
   a second display control unit which displays on the second screen a plurality of images received from the server through the network, in a display format in which the plurality of images are arranged and displayed on the second screen together; and
   an acquiring unit which acquires the image identification information and the moving image transmitted from the transmitting unit of said first information display apparatus,
   wherein, the second display control unit displays the moving image of the user of the first information display apparatus and an icon, representing that an image with this icon is the same as an image being displayed on the first information display apparatus, overlapped on a partial area of an image from among the plurality of images displayed on the second screen which is the same image as the image being displayed on the first screen of said first information display apparatus, based on the image identification information transmitted from the transmitting unit of said first information display apparatus and acquired by the acquiring unit.

4. A control method of a display system including a first information display apparatus having a first screen, a first display control unit and a transmitting unit, and a second information display apparatus having a second screen, a second display control unit and an acquiring unit, where each of the first and second information display apparatuses are connected to a network and receives images from a server, and displays the received images, the method comprising:
   in the first information display apparatus:
      a first display step in which the first display control unit displays on the first screen one or more images received from the server through the network; and
      a transmitting step in which the transmitting unit transmits to said second information display apparatus through the network, image identification information and display format information of one or more images being displayed on the first screen, wherein the display format information includes a display format of a slide show in which a plurality of image are sequentially displayed and switched with time; and in the second information display apparatus:
  a second display step in which the second display control unit displays on the second screen a plurality of images received from the server through the network, in a display format in which the plurality of images are arranged and displayed on the second screen together; and
  an acquiring step in which the acquiring unit acquires the image identification information and the display format information transmitted from the transmitting unit of said first information display apparatus in the transmitting step,
wherein, the second display step displays an icon, representing the display format information transmitted from the transmitting unit of said first information display apparatus in the transmitting step, overlapped on a partial area of an image from among the plurality of images displayed on the second screen, which is a same image as the image being displayed on the first screen of said first information display apparatus in the first display step, based on the image identification information and the display format information acquired by the acquiring step,
wherein, when the display format information, which has been transmitted in the transmitting step and acquired in the acquiring step, shows a display format of a slide show, the second display control unit changes a display position on the second screen of the icon representing the display format of the slide show, according to progress of the slide show in the first information display apparatus, and
wherein, when a first image is displayed on the first screen of the first information display apparatus as part of the slide show, the position of the icon representing the display format of the slide show is displayed on the corresponding first image among the plurality of image simultaneously being displayed on the second screen of the second information display apparatus, and when the slide show being displayed on the first screen progresses to a second image, the position of the icon representing the display format of the slide show displayed on the second screen changes its location from the first image to the corresponding second image among the plurality of images simultaneously being displayed on the second screen.

5. A control method of a display system including a first information display apparatus having a first screen, a first display control unit, a video camera unit which photographs a moving image of the user of the first information display apparatus, and a transmitting unit, and a second information display apparatus having a second screen, a second display control unit and an acquiring unit, where each of the first and second information display apparatuses are connected to a network and receives images from a server, and displays the received images, the method comprising:

in the first information display apparatus:
  a first display step in which the first display control unit displays on the first screen one or more images received from the server through the network; and
  a transmitting step in which the transmitting unit transmits to said second information display apparatus through the network, image identification information of one or more images being displayed on the first screen and the moving image of the user of the first information display apparatus; and in the second information display apparatus:
  a second display step in which the second display control unit displays on the second screen a plurality of images received from the server through the network, in a display format in which the plurality of images are arranged and displayed on the second screen together; and
  an acquiring step in which the acquiring unit acquires the image identification information and the moving image transmitted from the transmitting unit of said first information display apparatus in the transmitting step,
wherein, the second display step displays the moving image of the user of the first information display apparatus and an icon, representing that an image with this icon is the same as an image being displayed on the first information display apparatus, overlapped on a partial area of an image from among the plurality of images displayed on the second screen which is the same image as the image being displayed on the first screen of said first information display apparatus, based on the image identification information transmitted from the transmitting unit of said first information display apparatus in the transmitting step and acquired by the acquiring step.

* * * * *